United States Patent [19]
Campanelli et al.

[11] Patent Number: 5,768,440
[45] Date of Patent: Jun. 16, 1998

[54] ADAPTIVE NOISE REMOVAL FOR VIDEO IMAGES WITH LESS CORRECTION OF CURRENT PIXEL FOR HIGHER VARIATIONS BETWEEN SURROUNDING PIXELS

[75] Inventors: Michael R. Campanelli; Steven J. Harrington, both of Webster, N.Y.

[73] Assignee: Xerox Corporation, Stamford, Conn.

[21] Appl. No.: 767,352

[22] Filed: Dec. 18, 1996

[51] Int. Cl.$^6$ .............. G06K 9/40; G06K 9/44; G06T 5/00; H04N 1/409

[52] U.S. Cl. .............. 382/261; 382/264; 382/275; 358/463

[58] Field of Search .............. 382/261, 260, 382/262, 264, 275, 254; 358/463, 447

[56] References Cited

U.S. PATENT DOCUMENTS

| | | |
|---|---|---|
| 4,510,618 | 4/1985 | Ataman et al. .............. 382/275 |
| 4,827,533 | 5/1989 | Tanaka .............. 382/262 |
| 4,833,723 | 5/1989 | Loveridge et al. .............. 382/264 |
| 4,953,114 | 8/1990 | Sato .............. 382/237 |
| 5,091,972 | 2/1992 | Kwon et al. .............. 382/277 |
| 5,533,149 | 7/1996 | Kaplan et al. .............. 382/260 |
| 5,563,963 | 10/1996 | Kaplan et al. .............. 382/266 |
| 5,594,816 | 1/1997 | Kaplan et al. .............. 382/275 |

*Primary Examiner*—Scott Rogers
*Attorney, Agent, or Firm*—Robert Cunha

[57] ABSTRACT

A method of applying noise removal to an image so that the areas having the greatest variance have the least correction. First, the variance between each image pixel and its surrounding pixels is determined. Next, for the neighborhood around each pixel, a density of variance is determined. Finally the density of variance for the neighborhood around each pixel is used to correct the original pixel, the direction of correction being toward the mean value in the surrounding pixels. The result is that relatively uniform areas of the image, within which noise is most obvious, will get the most correction and areas that are textured will get the least.

4 Claims, 1 Drawing Sheet

ADAPTIVE NOISE REMOVAL FOR VIDEO IMAGES WITH LESS CORRECTION OF CURRENT PIXEL FOR HIGHER VARIATIONS BETWEEN SURROUNDING PIXELS

BACKGROUND OF THE INVENTION

A method of filtering noise out of smoothly varying areas of an image, such as the sky, while preserving detail in textured areas, by determining a multi-level neighborhood variance for each pixel, and applying the greatest amount of filtering to the pixels having the smallest variances.

Video images may contain noise in the form of occasional pixels with values that are too high or to low in one or more of their color components. A median filter, which determines the median pixel value in a neighborhood, compares each current pixel to the median, and corrects the current pixel by replacing it with the median value, is a well known technique for removing such noise. A threshold can also be provided so that only if the current pixel is strongly different from its surroundings, its value will be replaced by one of its neighbor's values. A median filter is desirable because its nonlinear behavior tends to preserve edges, and it does not blur the image as badly as linear filtering techniques for noise reduction. However, a median filter will still cause some blurring in areas that should be textured since it can not distinguish the texture from the noise. Not only is this blurring undesirable, but the noise removal may be unnecessary in the textured region since the noise may be hidden by the texture. For example, noise in a smooth area such as sky is quite offensive, but noise in a highly textured region such as vegetation may be undetectable.

What is required is a method that will delete noise from smoothly varying areas of an image while preserving detail in textured areas.

SUMMARY OF THE INVENTION

This method first determines the variance of each current pixel to its surroundings. The noise correction then is applied in accordance with the density of variance, the highest levels of correction going to the areas having the lowest density of variances. Thus, areas of low variance such as sky will have the greatest amount of noise removal while areas of high variance such as vegetation will have the least.

DETAILED DESCRIPTION OF THE INVENTION

Figure 1:
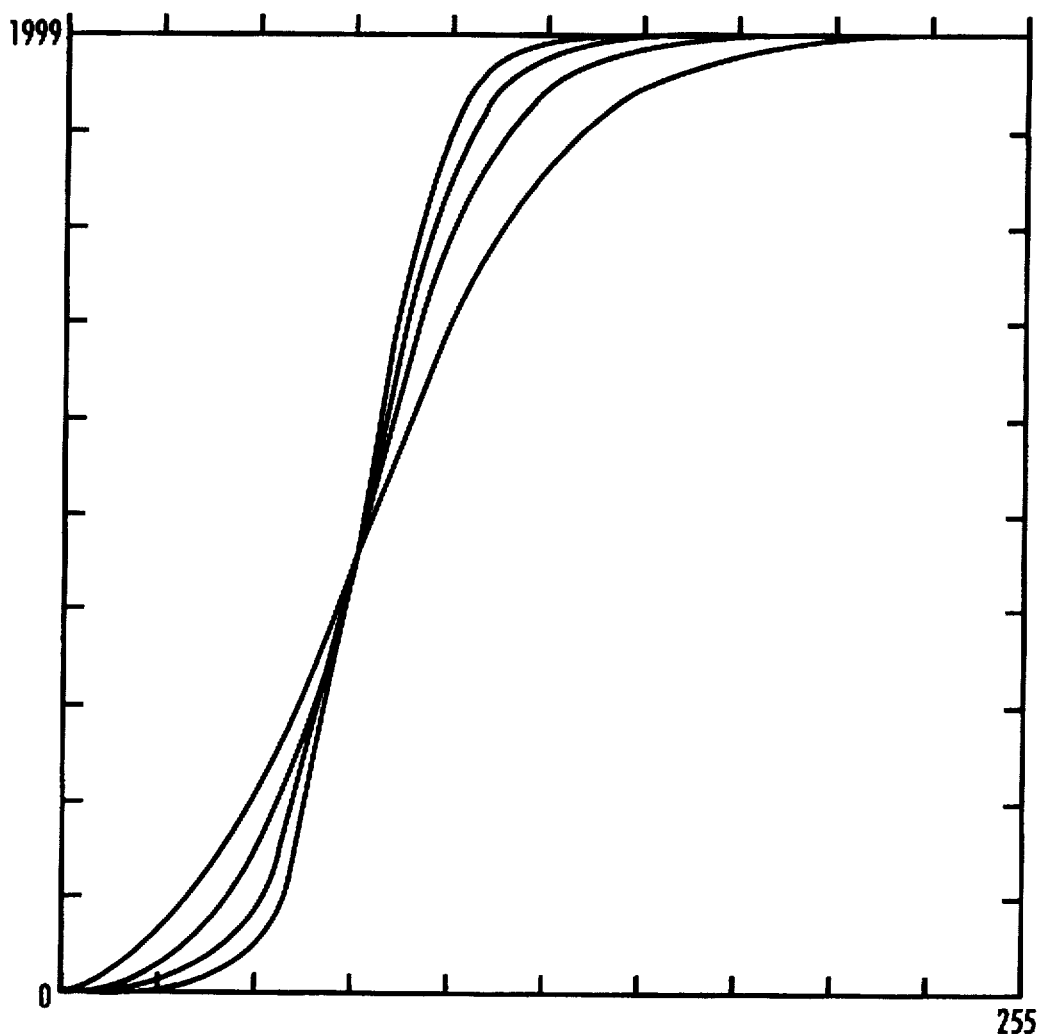
FIG. 1 is a set of curves showing how the amount of filtering can be weighted as a function of variance.

A printer frequently receives a digital image in the form of multi-bit pixels and prints it on paper using a raster output scanner. If the noise contained in the image is objectionable, a computer in the printer may filter the noise from the image prior to sending the image to the raster output scanner for printing. The noise in textured areas where individual pixels have high variance with respect to neighboring pixels is not likely to be noticed, while noise in areas of low variance tends to be noticeable and should be filtered out. Also, edge detail should be preserved as much as possible. The following is a method of reducing noise in smooth areas of an image while tending to preserve texture and edges.

This method can be thought of as having four main steps. The first is to generate from the original image a second image where each pixel in the second image has a value equal to the neighborhood frame variance of the corresponding pixel in the first image. This step is accomplished by proceeding from one pixel to the next. For each original current pixel, determine a neighborhood. This could be a surrounding 3×3 pixel area, a 5×5 pixel area, or any other geometric shape having the current pixel at its center. To compute the variance of the central pixel in the neighborhood, find the sum of the squares of the differences between each pixel in the neighborhood and the average of the pixels in the neighborhood, divided by one less than the number of pixels. The second image thus produced is an image of variances.

The second step is to generate from the second image a third image of density values. Assume that the variance values for each pixel are 0 to 256. These are divided into neighborhoods which could be any number of pixels, such as 3×3, 5×5, etc. This time the variance values of the pixels in each neighborhood are averaged, such as root mean squared, which produces an image of density valued pixels.

The third step is to form these pixels into regions which vary from low to high density. Again, to use a numerical value, let us assume that there will be 15 regions. Region 1 could be all pixels with density values of 0–15, region 2 could have values of 16–32, etc. Thus, lower numbered regions would contain pixels having lower density and higher numbered regions would have higher density. As a practical matter, in a system using eight bits per pixel, density values greater than 128 are rarely seen. Most often, there is not that much variation between pixels within a 3×3 or 5×5 neighborhood. Therefore, one simplification to the above system is to limit the density values to a maximum of 128 prior to dividing the image into regions.

The fourth step is to use the regions, such as 3×3 or 5×5, to decide how to filter the original image. Regions of low variance would have full noise removal, meaning that the original pixel in each neighborhood would be replaced with a median or average pixel of the neighborhood, and regions of high variance would have no noise removal, meaning that the original pixels would not be corrected at all. A density threshold could be used to decide if there would be a correction.

A problem with filtering images is that edge detail, in addition to noise, may be filtered out, leading to a significant loss of image fidelity. This can be minimized by applying noise removal as weighted by a Sigmoid function, shown in FIG. 1, or some other similar function. In this FIGURE, the vertical axis is the amount of original image data that is allowed to remain in the image, and the horizontal axis is the density value of the region containing the current pixel. In other words, at the top of the diagram the final image data would be completely made up of original data, while at the bottom of the diagram, almost none of the data would be original, and almost all would the filtered median or average value of the original neighborhood. Four possible curves are shown, but any other may be used. Generally, uniform areas of the image will fall into the left portion of the graph, and most noise will be removed while areas of the image having high variance will fall toward the right and very little or no filtering will be applied. If an edge is defined as a sharp transition between fairly uniform light and dark areas, then an area containing an edge will have a moderate amount of variance. Therefore, the curve is set so that moderate amounts of variance will result in little filtering to preserve the edge.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. An adaptive noise removal method for pixels of an original digital image comprising the steps of:

generating from the original image a first numerical value which is a function of the difference between the current pixel and other pixels in a first neighborhood surrounding the current pixel, generating from the first numerical value a second numerical value which is a function of the amount of variation between pixel values in a second neighborhood surrounding the current pixel, and using the second numerical value of each pixel to correct the current pixel of the original image by decreasing the difference between the value of the current pixel and the other pixels in the first neighborhood, the higher second numerical values of each pixel resulting in less correction to each pixel in the original image.

2. The method of claim 1 wherein the first numerical value of the current pixel is equal to the variance of the current pixel in the original image compared to the other pixels in the first neighborhood.

3. The method of claim 1 wherein the calculated second numerical value of the current pixel is equal to the root mean square of the first numerical values.

4. The method of claim 1 wherein the correction decreases the difference between the value of the current pixel and the median value of the other pixels in the original image.

* * * * *